United States Patent [19]

Brent et al.

[11] Patent Number: 5,381,408
[45] Date of Patent: Jan. 10, 1995

[54] PACKET TRANSMISSION SYSTEM

[75] Inventors: Jason B. Brent, Newport Beach, Calif.; Edward Hatala, Devizes, England

[73] Assignee: Cray Communications Limited, Surrey, United Kingdom

[21] Appl. No.: 64,270

[22] Filed: May 19, 1993

[30] Foreign Application Priority Data

May 19, 1992 [GB] United Kingdom ............... 9210646

[51] Int. Cl.$^6$ .................................................. H04L 12/56
[52] U.S. Cl. ...................................... 370/60; 370/94.1
[58] Field of Search ............... 370/108, 105.1, 100.1, 370/94.1, 60, 13, 16, 60.1, 58.1–58.3, 94.2

[56] References Cited

U.S. PATENT DOCUMENTS

| | | | |
|---|---|---|---|
| 4,775,987 | 10/1988 | Miller | 370/108 |
| 4,800,560 | 1/1989 | Aoki et al. | 370/108 |
| 4,817,085 | 3/1989 | De Prycker | 370/108 |
| 5,212,690 | 5/1993 | Löw | 370/108 |

FOREIGN PATENT DOCUMENTS

| | | |
|---|---|---|
| 0016477 | 10/1980 | European Pat. Off. . |
| 0130431 | 1/1985 | European Pat. Off. . |
| 0234859 | 9/1987 | European Pat. Off. . |
| 2261799 | 5/1993 | United Kingdom . |
| WO84/00268 | 1/1984 | WIPO . |
| WO91/02419 | 2/1991 | WIPO . |

Primary Examiner—Wellington Chin
Assistant Examiner—Ajit Patel
Attorney, Agent, or Firm—Young & Thompson

[57] ABSTRACT

A packet transmission system in which variable delays are compensated for by packetizing an input signal so as to produce packets at a predetermined packet frequency (3), allocating a sequence number to each packet (6), transmitting these packets over a network to an endpoint (7), and forming the packets into an output signal at the endpoint by reference to their sequence number (12) and by delaying each as necessary (9, 10) so that they are all delayed by substantially the same predetermined delay time with reference to the packet frequency. Preferably, the delay in the transmission of each packet through the network is measured by comparison of the time of arrival of the packet at the endpoint relative to a timing signal (11) synchronized with or running plesiochronously with the predetermined packet frequency. The endpoint delay is then set so that the sum of the measured delay and the endpoint delay is substantially equal to the predetermined delay time, which is assessed as the maximum delay for acceptable output signal quality.

9 Claims, 2 Drawing Sheets

PACKET TRANSMISSION SYSTEM

TECHNICAL FIELD

This invention relates to a packet transmission system and a method of, and means for compensating for delays of packets in such a system.

It is known in a packet switching system to provide each packet with a time stamp field in which to record delays incurred as the packet traverses the system. In particular, it is known to measure the variable time taken by each packet to traverse each node of a packet switching network and to add this time to the time stamp field. Delays across the node are caused by queuing of the packets in storage means and are random in nature. The time stamp field therefore records an accumulated value of the variable delay in traversing the network, this being an especially important parameter when packets are used to transmit voiceband information, the received quality of which deteriorates unacceptably unless some form of variable delay compensation is provided. However, the use of a time stamp field in this manner increases the overhead for the packets and involves additional processing capacity at each node in the network.

DISCLOSURE OF THE INVENTION

An object of the present invention is to provide a packet transmission system in which variable delays can be compensated for more simply than in the known systems.

This is achieved according to the present invention by packetizing an input signal so as to produce packets at a predetermined packet frequency and allocating a sequence number to each packet, transmitting these packets over a network to an endpoint, and forming the packets into an output signal at the endpoint by reference to their sequence number and by delaying each as necessary so that they are all delayed by substantially the same predetermined delay time with reference to said packet frequency.

Preferably, the delay in the transmission of each packet through the network is measured by comparison of the time of arrival of the packet at the endpoint relative to a timing signal synchronised with or running plesiochronously with said predetermined packet frequency. The endpoint delay is then set so that the sum of the measured delay and the endpoint delay is substantially equal to said predetermined delay time, which is assessed as the maximum delay for acceptable output signal quality. Thus, variable transmission delays are accommodated within a predetermined maximum acceptable delay time which is preferably adaptively adjusted by reference to the measured delay times of successive packets so that it is reduced to a minimum.

The invention therefore avoids the need for time stamping at each node of a network, and instead by continuously producing sequenced packets at a predetermined frequency, the packet transmission delays can be readily measured at the endpoint with reference to this packet frequency and compensated for within said predetermined maximum acceptable delay time.

DESCRIPTION OF THE DRAWINGS

The invention will now be described by way of example with reference to the accompanying drawings in which.

MODE OF CARRYING OUT THE INVENTION

Figure 1:
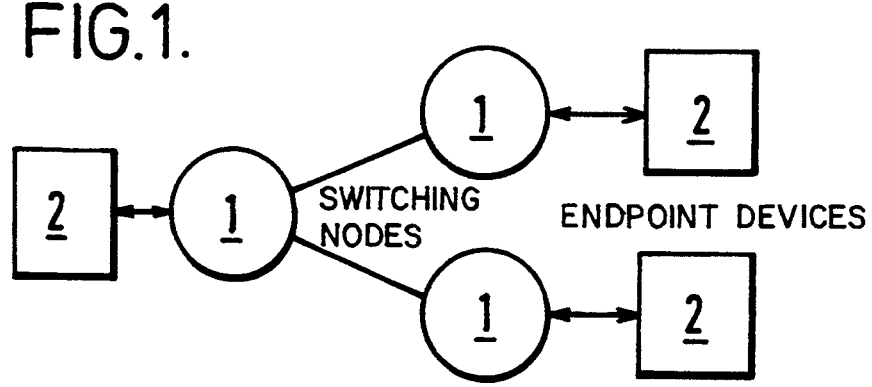
FIG. 1 is a schematic diagram of a packet transmission system.

The packet transmission system illustrated schematically in FIG. 1 comprises a network of interconnected packet switching nodes 1 with endpoint devices 2 connected to them so that they can communicate with one another via the network. Data is transferred between the endpoints 2 in the form of packets within a frame format known as frame relay. Each packet has a header including a logical address field by means of which it is routed through the network. Each node refers to the logical address field in order to select the appropriate output to which to route it.

Figure 2:
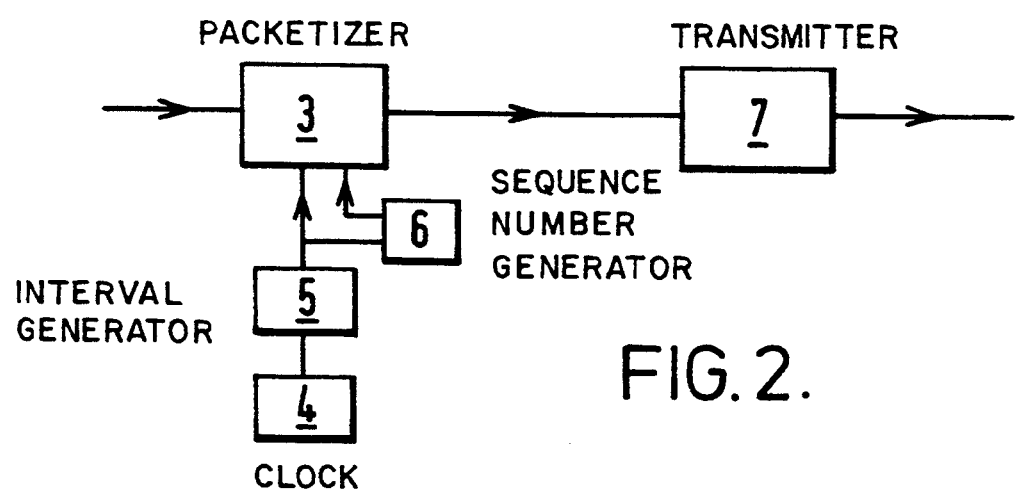
FIG. 2 is a schematic diagram of the originating endpoint of packets in the system of FIG. 1.
Figure 3:
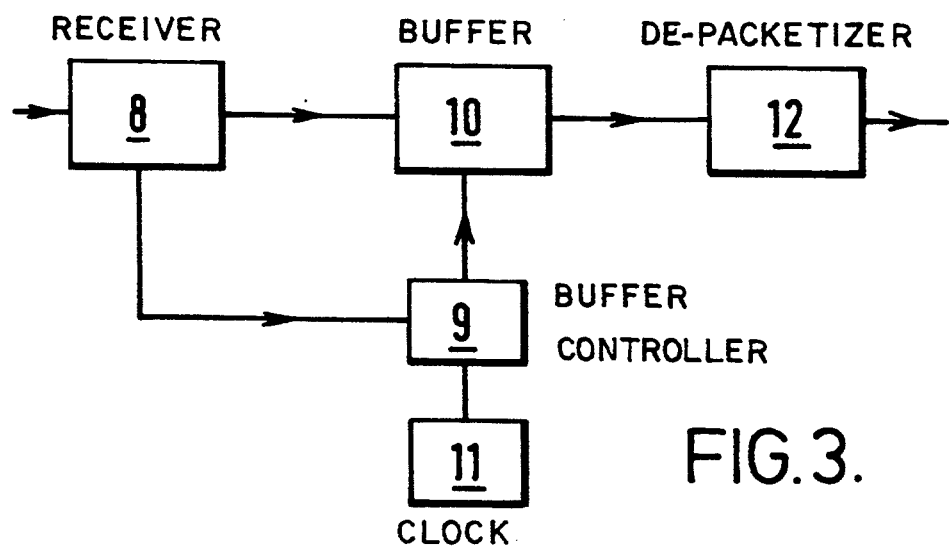
FIG. 3 is a schematic diagram of the terminating endpoint of packets in the system of FIG. 1.

Each endpoint device 2 is capable of acting as an originating endpoint device which produces and transmits packets, or a terminating endpoint device which receives packets. FIG. 2 shows an endpoint device 2 when operating as an originating endpoint. In these circumstances, a synchronous voiceband signal (e.g. digital voice, facsimile or video data) is received at a packetizer device 3 and formed into packets in a continuous manner. The packets are produced at a predetermined timing interval as determined by a clock 4 and a packetization interval generator 5. A sequence number generator 6 is driven from the interval generator 5 and allocates a sequence number to each interval, which sequence number is inserted in the header of the associated packet. A transmitter 7 receives the packets from the packetizer and transmits these to the network for delivery via the nodes 1 to a terminating endpoint device 2, such as shown in FIG. 3.

At the terminating endpoint, the packets are received by a receiver 8 which reads the sequence number from the header of each and writes this to a buffer controller 9 before passing the packet onto a buffer 10. The buffer controller 9 operates in synchronism with the packetization interval through a clock 11 synchronised with the clock 4 driving the packetization interval generator 5. The function of the buffer controller is to release packets from the buffer 10 at the correct timing so that each arrives at a de-packetizer 12 a predetermined time delay after the corresponding synchronisation signal, this time delay being sufficient to accommodate variable delays in the network.

Figure 4:
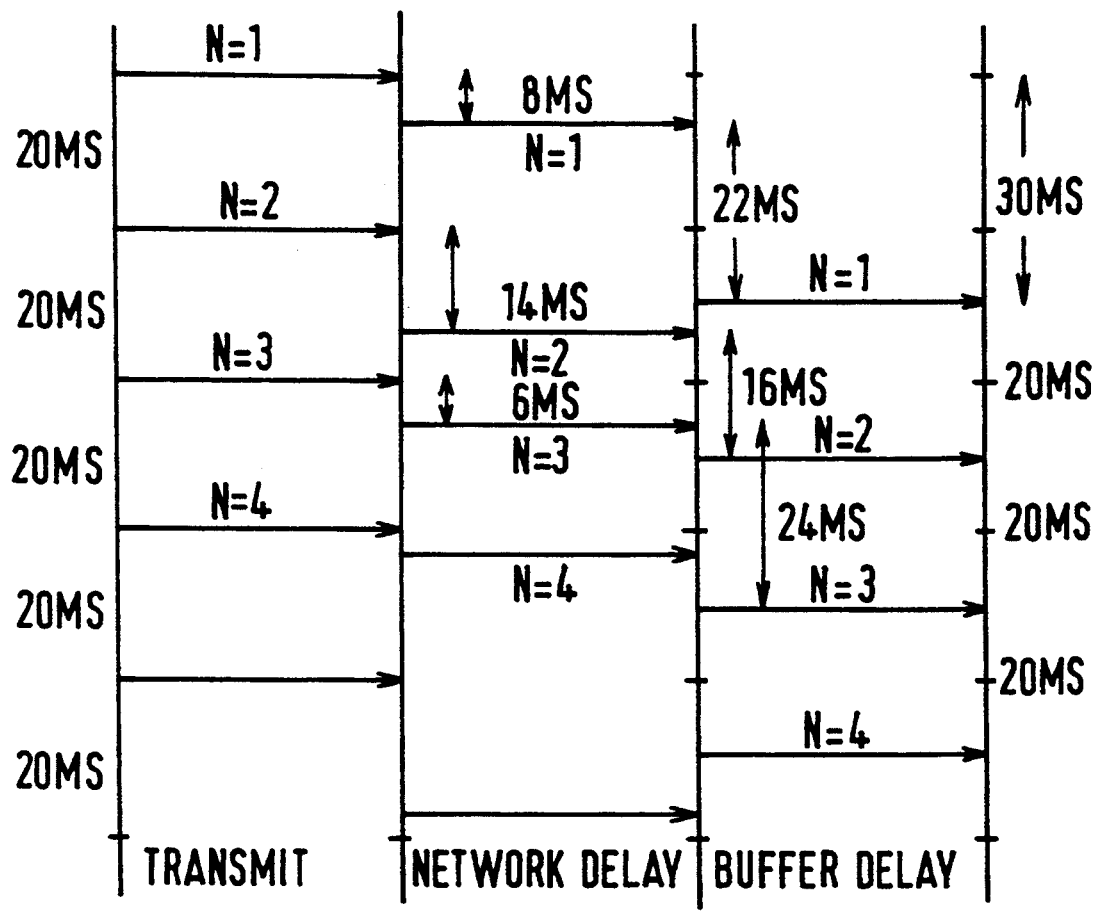
FIG. 4 is a diagram showing the timing sequence of packets within the system of FIG. 1.

The manner in which the buffer controller 9 operates can be better understood with reference to the timing diagram of FIG. 4 which shows an example of a packet interval of 20 msec. and a predetermined delay time of 30 msec. A packet sequence number 1 arrives at the receiver 8 after suffering a delay in the network of 8 msec. The buffer controller 9 measures this delay from the arrival time of the packet and the timing signal from clock 11, and calculates that an additional delay time of 22 msec. is required to give a total delay time of 30 msec. The packet is therefore delayed in the buffer 10 for a further 22 msec. before it is released to the de-packerizer 12.

Similarly, the time of arrival of the packet sequence number 2 at the receiver 8 is monitored and the network delay time of 14 msec. calculated. This packet is then delayed in the buffer 10 for a further 16 msec. It will be noted that this second packet is passed to the de-packetizer 12 20 msec. after the first packet so that the packet interval is maintained at the terminating endpoint.

Figure 5:
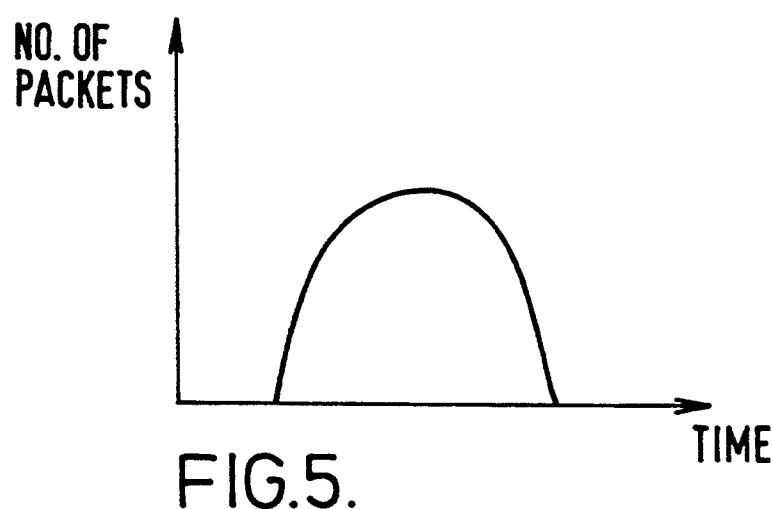
FIG. 5 is a diagram illustrating the distribution of measured variable delay times in the system of FIG. 1.

The buffer controller 9 analyses the measured delay times in the network and produces a distribution count as shown in FIG. 5 which it uses to determine the optimum predetermined delay time so that it can vary this in an adaptive manner to suit the operating conditions of the system.

We claim:

1. A method of compensating for delays in a packet transmission system comprising packetizing an input signal so as to produce packets at a predetermined packet frequency, allocating a sequence number to each of said packets, transmitting said packets in sequence over a network to an endpoint, processing said packets to form an output signal at said endpoint by reference to the sequence numbers allocated to them, recording the time of arrival of said packets at the endpoint, delaying said packets at the endpoint by a variable delay so that each packet is delayed by a predetermined time delay between transmitting said packets and processing said packets at said endpoint, analyzing the times of arrival of said packets at the endpoint so as to determine a distribution characteristic for them, and adapting said predetermined time delay in accordance with variations of said distribution characteristic so as to control the quality of said output signal.

2. A method as claimed in claim 1 in which the time of arrival of each packet at the endpoint is recorded relative to a timing signal synchronized with or running plesiochronously with said predetermined packet frequency and used to measure the transmission delay.

3. A method as claimed in claim 1 in which said predetermined time delay is set at a minimum acceptable value in accordance with a predetermined quality for said output signal.

4. A packet transmission system comprising packetizing means to transform an input signal into packets at a predetermined packet frequency, packet numbering means connected to said packetizing means to allocate a sequence member to each of said packets in sequence, transmitting means connected to said packet numbering means to transmit said packets in sequence over a network to an endpoint, packet processing means to receive packets from said network at said endpoint and produce a corresponding output signal by reference to the sequence numbers allocated to them, timing means connected to the packet processing means for timing the arrival of packets at the endpoint, delaying means connected to the packet processing means for delaying said packets at the endpoint by a variable delay so that each packet is delayed by a predetermined time delay between said transmitting means and said packet processing means, analyzing means connected to the timing means to analyze the times of arrival of said packets at the endpoint so as to determine a distribution characteristic for them, and adapting means connected to the analyzing means and the delaying means to adapt said predetermined time delay in accordance with variations of said distribution characteristic so as to control the quality of said output signal.

5. A packet transmission system as claimed in claim 4 in which the timing means comprises clock means that generates a timing signal synchronized with or running plesiochronously with said predetermined packet frequency, and delay measuring means connected to the packet processing means and said clock means to measure the transmission delay of each packet by reference to the time of arrival of the packet at the endpoint and the timing signal.

6. A packet transmission system as claimed in claim 4 in which said adaption means sets said predetermined time delay at a minimum acceptable value in accordance with a predetermined quality for said output signal.

7. A packet transmission delay compensating system comprising packet processing means to receive packets from said network and to produce a corresponding output signal by reference to transmission sequence numbers allocated to the packets during transmission, timing means connected to the packet processing means for timing the arrival of said received packets, delaying means connected to the packet processing means for delaying the packets by a variable delay so that each packet is delayed by a predetermined time delay between transmission and processing by said packet processing means, analyzing means connected to the timing means to analyze the times of arrival of said packets at the endpoint so as to determine a distribution characteristic for them, and adapting means connected to the analyzing means and the delaying means to adapt said predetermined time delay in accordance with variations of said distribution characteristic so as to control the quality of said output signal.

8. A packet transmission delay compensating system as claimed in claim 7 in which the timing means comprises clock means that generates a timing signal synchronized with or running plesiochronously with the frequency of transmission of said packets, and delay measuring means which measures the transmission delay of each packet by reference to the time of arrival of the packet and the timing signal.

9. A packet transmission delay compensating system as claimed in claim 7 in which said adaption means sets said predetermined time delay at a minimum acceptable value in accordance with a predetermined quality for said output signal.

* * * * *